US012675783B2

(12) United States Patent
Welch

(10) Patent No.: US 12,675,783 B2
(45) Date of Patent: Jul. 7, 2026

(54) CORRELATING MESSAGES FROM ASYNCHRONOUS MESSAGE QUEUES USING POLLING WITH EXPONENTIAL BACKOFF AND JITTER

(71) Applicant: PAYPAL, INC., San Jose, CA (US)

(72) Inventor: Skye Welch, Edinburgh (GB)

(73) Assignee: PAYPAL, INC., San Jose, CA (US)

( * ) Notice: Subject to any disclaimer, the term of this patent is extended or adjusted under 35 U.S.C. 154(b) by 47 days.

(21) Appl. No.: 18/769,179

(22) Filed: Jul. 10, 2024

(65) Prior Publication Data

US 2025/0029083 A1     Jan. 23, 2025

Related U.S. Application Data

(60) Provisional application No. 63/514,067, filed on Jul. 17, 2023.

(51) Int. Cl.
G06Q 20/20          (2012.01)
(52) U.S. Cl.
CPC .................................. G06Q 20/204 (2013.01)
(58) Field of Classification Search
CPC .................................................... G06Q 20/204
See application file for complete search history.

(56) References Cited

U.S. PATENT DOCUMENTS

| | | | |
|---|---|---|---|
| 11,159,634 B1 | 10/2021 | Deshpande et al. | |
| 2004/0243517 A1* | 12/2004 | Hansen ................ | G06Q 20/382 |
| | | | 705/64 |

| | | | |
|---|---|---|---|
| 2013/0144762 A1 | 6/2013 | Nguyen | |
| 2014/0259018 A1* | 9/2014 | Jain ....................... | G06F 9/4881 |
| | | | 718/102 |
| 2015/0186871 A1* | 7/2015 | Laracey ............... | G06Q 20/322 |
| | | | 705/41 |
| 2019/0034936 A1 | 1/2019 | Nolan et al. | |

(Continued)

OTHER PUBLICATIONS

Kotha, Rajesh. "The Impact of Messaging Queues on Real-Time Data Exchange in Large-Scale applications." International Journal of Innovative Research and Creative Technology. vol. 7, Issue 3. May 2021. (Year: 2021).*

(Continued)

*Primary Examiner* — Nathan A Mitchell
(74) *Attorney, Agent, or Firm* — Haynes and Boone, LLP

(57)          ABSTRACT

There are provided systems and methods for correlating messages from asynchronous message queues using polling with exponential backoff and jitter. A service provider, such as an electronic transaction processor for digital transactions, may provide computing services to users, which may be used to engage in interactions with other users and entities including for electronic transaction processing. When utilizing these transaction processing services, merchant locations may utilize payment terminals, such as card and NFC readers, as well as point-of-sale devices, each of which may independently send transaction messages to the service provider. To correlate these messages from different queues, the messages may be stored when received in an intermediary storage independently and the other storage polled at intervals with exponential backoff to identify corresponding messages and data. Further, jitter may be introduced to the polling process to stagger polling events for different messages.

20 Claims, 6 Drawing Sheets

/100

/110

Card Payment System
Card Payment Message 112

/120

Point of Sale (POS) Device
POS Purchase Message 122

Network
150

/130

Transaction Processor
Message Queue Handler 140
Messages 112 and 122
Storage Operations 142
Polling Operations 144
Exponential Back Off 146
Jitter 148
Transaction Processing Application 132
Transaction 134
Messages 112 and 122
Database 136
Network Interface Component 138

(56)  References Cited

U.S. PATENT DOCUMENTS

| | | | |
|---|---|---|---|
| 2019/0068622 A1* | 2/2019 | Lin ..................... | H04L 63/1441 |
| 2020/0074460 A1* | 3/2020 | Tapang .................. | G06Q 40/04 |
| 2021/0103919 A1 | 4/2021 | Mullen | |
| 2023/0185860 A1* | 6/2023 | Hibser ............... | G06F 12/0802 |
| | | | 707/608 |

OTHER PUBLICATIONS

International Search Report and Written Opinion for Application No. PCT/US2024/037920, mailed on Oct. 9, 2024, 14 pages.

* cited by examiner

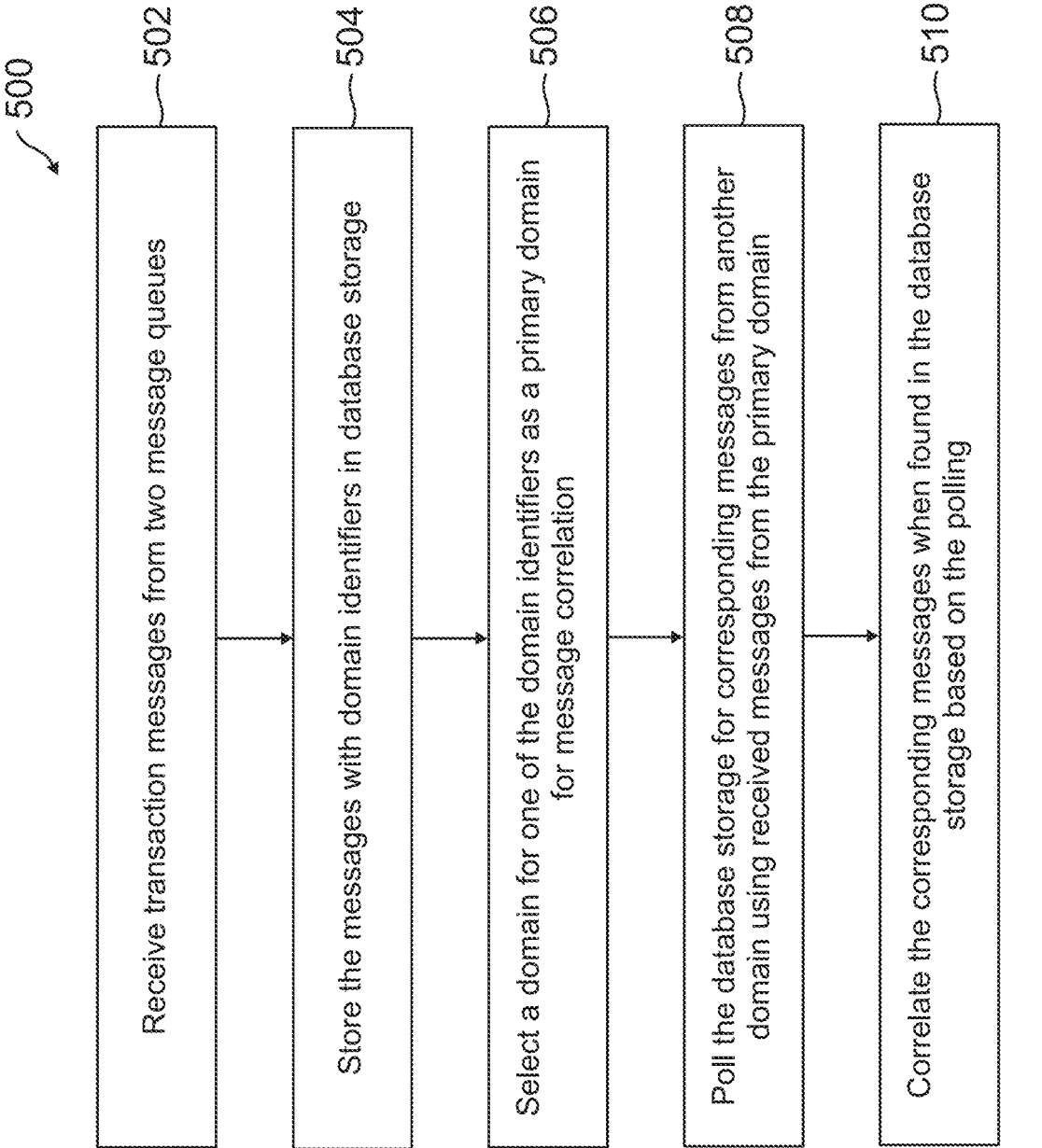

500

502 Receive transaction messages from two message queues

504 Store the messages with domain identifiers in database storage

506 Select a domain for one of the domain identifiers as a primary domain for message correlation 508 Poll the database storage for corresponding messages from another domain using received messages from the primary domain 510 Correlate the corresponding messages when found in the database storage based on the polling

FIG. 5

CORRELATING MESSAGES FROM ASYNCHRONOUS MESSAGE QUEUES USING POLLING WITH EXPONENTIAL BACKOFF AND JITTER

CROSS-REFERENCE TO RELATED APPLICATIONS

The present application claims priority to and the benefit of U.S. Provisional Patent Application No. 63/514,067, filed Jul. 17, 2023, all of which is incorporated by reference herein in its entirety.

TECHNICAL FIELD

The present application generally relates to message processing and asynchronous message queues and more particularly to correlating messages from separate message queues that arrive asynchronously.

BACKGROUND

Users may utilize online transaction processors for processing payments with merchants using payment cards, digital accounts through device applications, and the like. These online transaction processors may provide payment options for in-person transaction processing and use at merchant locations. In this regard, merchants may utilize in-person payment terminals, such as point-of-sale (POS) devices that may include card readers and other payment terminals. Merchants may implement payment services and processing functionalities from transaction processors through these POS devices and/or other payment terminals. Users may then pay utilizing credit or debit cards, digital wallets through mobile applications, and the like. Conventionally, service providers may receive POS data from POS devices and card reader data and other payment terminal data from such corresponding card readers and/or payment terminals. Thus, two messages may be received, which due to the devices, networks, and processing speeds, may arrive asynchronously.

As such, a service provider may be required to correlate asynchronous messages from two incoming message queues (e.g., data and messages for card payments and POS purchases). However, the service provider may require that the card payment data is matched to the POS purchase data in order to "pay out" card payments to merchants, merchant digital wallets, and/or other accounts. However, since this involves a digital transfer of money, the process is sensitive to latency. For example, there may be a target timeline of 5 seconds from card reading and payment until effectuating the digital transfer to the merchant's digital wallet. Conventional systems may need to poll both queues frequently (e.g., every second), which wastes resources as the service provider may often not have received both messages, causing the polling to be unsuccessful. This also may limit the maximum throughput of all data processing as system resources are wasted on these polling "misses." However, while more infrequent polling may be more efficient, resulting in fewer "misses," which may lower system resource usage, this increases latency to data processing when both messages may be received but polling is not yet scheduled or will not occur during a wait time period. Consequently, conventional systems are not both fast and efficient. Thus, it is desirable for service providers to utilize more efficient message correlation systems and data polling from databases and other data storages while reducing message correlating and data processing latency.

BRIEF DESCRIPTION OF THE DRAWINGS

FIG. 5 is a flowchart for correlating messages from asynchronous message queues using polling with exponential backoff and jitter, according to an embodiment.

Figure 1:
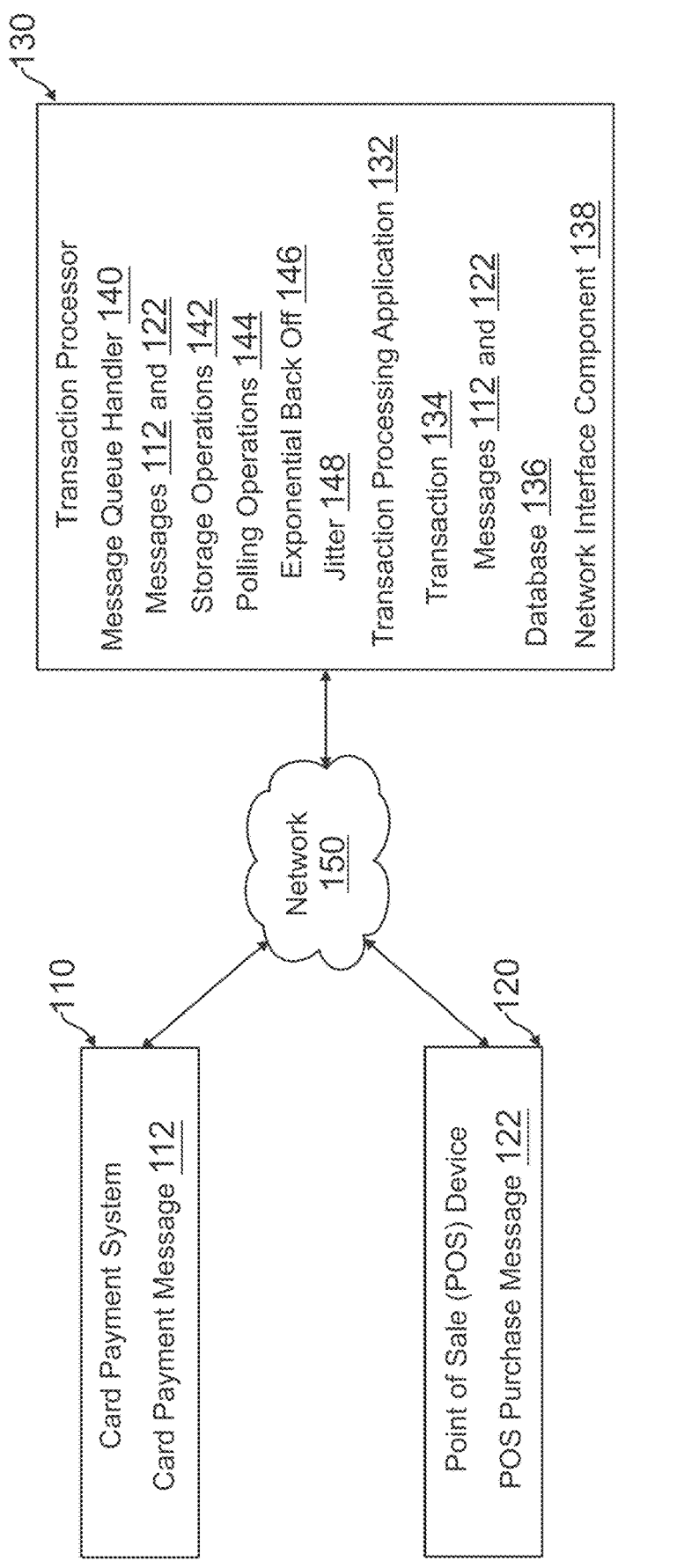
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for correlating messages from asynchronous message queues using polling with exponential backoff and jitter. Systems suitable for practicing methods of the present disclosure are also provided.

A user may utilize a digital account, payment card, and/or other funding source to process payments through an electronic payment and/or transaction network associated with a backend payment processor or other entity on the network. An identifier may be linked to a digital account of the user with an online transaction processor, such as a payment service provider (e.g., PAYPAL®) that may provide electronic transaction processing services to users through the account and one or more real-world physical locations, websites, and/or applications of a merchant. The online transaction processor may include an integration with the electronic payment network (e.g., for payment cards, tokens, and the like) that allows for data exchange and communications between the two networks, such as to process transactions (e.g., approve or decline, and well as request monetary payments, transfers, conversions, etc.) and issue receipts or other transaction histories. Further, this payment network may provide data communications and backend processing devices that provide for interaction with frontend merchant, POS, and/or payment terminal processing devices that process transactions. In some embodiments, such frontend merchant devices may include POS devices and/or payment terminals that may process transactions and payments via mobile applications and/or payment cards.

In a typical scenario with in-person, real-world transactions, a user may purchase items via a payment card or a software application using a digital account at a merchant storefront, retail location, or the like that provides in-person transaction processing through POS devices, payment terminals, and other merchant devices and systems. Selection of one or more items in an in-person transaction at a physical merchant location may require a payment instrument from the user for electronic transaction processing, which may be provided through a payment card and embedded or encoded data (e.g., magnetic stripe, EMV chip, NFC chip, etc.), digital token, identifier, data package, or the like that is transmitted to a merchant device at the location. With mobile applications and devices, payment may be made via short-range wireless communications (e.g., contactless payments via NFC, RFID, etc.) using a digital wallet with an online service provider or other transaction processor. After providing a payment instrument for a transaction, the merchant may process the transaction using the payment terminal reading or receiving the payment instrument and the POS device that generated the transaction and/or processed item, transaction, shipping, user, merchant, and other information to effectuate transaction processing and have a payment made to an account of the merchant. However, two messages may be generated and provided to the transaction processor or other service provider for processing and resolution, one from card or device via the payment terminal and the other from the POS device when processing item, merchant, user, or other similar information. These may be generated and provided asynchronously, at different times, and/or via different communication channels. As such, the service provider may be required to correlate, merge, and/or combine these messages for transaction processing and fulfillment, including providing a payment or transfer to the merchant's account.

To do this, the service provider may establish two queues for two communication channels and/or transaction or data processing components that transmit the messages to the service provider (where additional queues may also be provided as needed). Each queue may correspond to an endpoint or destination address for messages provided by the corresponding processing component, such as transaction messages from card payments or from POS data and processing. Upon receiving messages, the service provider may immediately store received messages from both queues in a database, and may further tag the messages with a domain identifier (such as "card payment identifier (ID)" and "POS purchase ID"). The service provider may then (randomly, procedurally, or based on a preference or system setting) choose one of the storage queues in the database as the "primary" queue, and when receiving a message, may perform a look up or polling in the other secondary queue storage for the associated message with a corresponding other domain identifier in order to correlate them. Look up or polling may be performed using common data, shared identifiers, timestamps, merchant/user information, and/or other data used to correlate the two messages. The service provider may poll these "ephemeral" storage queues using an exponential backoff wait time for time intervals between polling, such as 1, 2, 4, 8, 16, etc., seconds up to a maximum retry wait period (e.g., 1 minute to retry, where these specific values may be configurable). Further, during polling with exponential backoff waits, the service provider may add a jitter parameter to the exponential backoff based on the final calculated wait time to avoid having multiple queue readers all access the queue(s) at the same time, thereby causing a "thundering herd" problem.

In this regard, a user may first establish an account with a service provider to engage in electronic transaction processing and/or link to payment cards for payment services and/or transaction history tracking and services. A digital account with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information.

The user may also be required to provide financial information, including digital account (e.g., credit/debit card) information, bank account information, gift card information, benefits/incentives, and/or financial investments, when processing transactions with merchants and/or other users or entities. Account creation may also be used to establish account funds and/or values, such as by transferring money into the account and/or establishing a credit limit and corresponding credit value that is available to the account and/or card. The service provider may provide computing services to send, store, and receive money, process financial instruments, and/or provide transaction histories. The service provider may also provide for tokenization of data for transaction processing. The application or website of the service provider, such as PAYPAL® or other online payment provider, may provide payments and the other transaction processing services. Moreover, the digital account may be utilized through one or more mobile applications for mobile devices or other software applications.

In order to pay for the transaction using the account (e.g., a transfer or payment to another user, merchant, or other entity), the user may provide the digital account or funding source information and/or may login to an account with the service provider through authentication information in a software application. When providing in-person payments through payment terminals and a mobile device, a digital wallet of an external wallet or service provider may be utilized with the account to provide data to the terminal or device wirelessly. In this regard, an identifier and/or digital token or other data may authorize and/or authenticate the user for their digital wallet use and/or a payment instrument in the digital wallet (e.g., the account with the online transaction processor), which may be transmitted to another party for payment processing via wireless communications. The data may be stored by and/or transferred using one or more storage mediums and/or wireless transceivers, such as an NFC/RFID component, fob, passive or active antenna, etc., a magnetic stripe or an EMV chip, a displayable code or data, or the like. A payment may then be issued to the other party to the transaction. To issue the payment timely and without error, message correlation between asynchronous queues may be required, which may utilize the operations and components described herein to provide in a fast and efficient manner while minimizing system resource usage and computing errors or crashes.

After payment processing, the POS and payment terminal device, and well as other merchant systems and/or components, may generate transaction messages having data for processing and recording transaction and payment data. For example, transaction messages from payment terminals and other card processors may include provided card data, a digital token or other data from an NFC scan, QR code reading, or the like (which may include data from mobile applications), a payment total, payment authorization data, and the like. Transaction messages from POS devices may include item information, receipt identifiers and information, merchant and/or user information, and the like. A combination of such data may be required to properly record the transaction in a transaction history and/or process a payment between the user and merchant. Each message may be provided to the service provider in a corresponding message queue for the transaction processing component and message type or originator.

When received by the transaction processor or other service provider, the messages are stored in a database, such as an ephemeral storage, cache, or the like. The storage may be ephemeral in that messages stored to the database may be stored for a time period until the messages are correlated to messages from other queues and a combined data container or object is generated and utilized by the service provider for processing. After processing, the messages may be deleted and cleared from the storage, thereby conserving memory space and making the database an ephemeral storage or cache for the messages. The service provider may then select one of the storage queues at the primary queue for polling of the secondary queue's message storage using shared message data and/or identifiers for message correlation. Each message may have a domain identifier and therefore the secondary queue's messages in the ephemeral storage may be identified through polling using the shared message data and domain identifier of the secondary queue.

Polling may occur with a backoff so that wait times for time intervals between successive or consecutive polling operations of the storage for the corresponding transaction message may increase. This allows more efficiency and speed by quickly correlating incoming messages sent in a fast manner while reducing "misses" or unnecessary polling of the storage where messages may not be highly correlated in transmission time and delayed. During polling, a jitter parameter or operation may be introduced to the polling. Jitter may correspond to the incremental, small, randomized, and/or otherwise varied delay in times between polling or other data querying, searching, and retrieving operations. Jitter may be introduced through the operation in order to keep polling for different messages asynchronous and avoid too many executing polling operations of the storage at the same time where polling may become synchronized over time. As such, jitter may be introduced to prevent or minimize the aforementioned thundering herd problem, which may prevent or limit synchronous polling of the storage when too many polling events occur at once.

Once polled, the service provider may correlate the messages by shared data, storage location, and the like. The service provider may then create a combined data container or object, or may access and correlate such data together, so that the messages may be stored together in a single and/or correlated data object for processing. The service provider may then use the correlated data for further data processing, such as by providing and/or effectuating a payment from one account or payment instrument to an account and/or digital wallet of the service provider. Thus, the correlated messages may create actionable data that may be processed to complete electronic transaction processing and/or record the transaction. In this manner, the service provider may provide faster and more efficient message handling in different data and communication queues and storages. This allows service provider systems to increase data processing throughput and free up wasted computing resources from conventional message correlation operations. Further, the operations provide faster electronic transaction processing and electronic payment to digital wallets of merchants. Therefore, a merchant and/or digital wallet system may more quickly view the results of electronic transaction processing provided through computing systems of the service provider.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a card payment system 110, a POS device 120, and a transaction processor 130, in communication over a network 150. Card payment system 110 and/or POS device 120 may be used to establish a transaction and process a payment for the transaction. In this regard, when the transaction is processed, transaction data may be processed using messages sent asynchronously from card payment system 110 and POS device 120, where transaction processor 130 may resolve transaction processing by correlating the messages received asynchronously. Card payment system 110 and/or transaction processor 130 may then provide electronic transaction processing services.

Card payment system 110, POS device 120, and/or transaction processor 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Card payment system 110 may be implemented using any appropriate hardware and software configured for wired and/or wireless communication with user devices, and may correspond to merchant devices, payment terminals, contactless payment transceivers and devices, and the like used for processing a transaction. Card payment system 110 may correspond to and/or be used by a merchant and/or merchant employee that processes payments and sales at a physical merchant location. In various embodiments, card payment system 110 may be implemented as a personal computer (PC), a payment terminal device with payment processing components, a smart phone, laptop/tablet computer, wrist-watch with appropriate computer hardware resources, other type of wearable computing device, and/or other types of computing devices capable of transmitting and/or receiving data. Although only one device is shown, a plurality of devices may function similarly. Card payment system 110 of FIG. 1 contains a card payment message 112 that may be transmitted to transaction processor 130 for processing and resolution, which may be sent asynchronously from messages from POS device 120.

POS device 120 may be implemented using any appropriate hardware and software configured for wired and/or wireless communication with user devices, and may correspond to merchant POS devices and registers that may be used to enter and process transaction data, such as item information, prices, taxes, tips, and the like. POS device 120 may correspond to a merchant and/or merchant employee that processes payments and sales at a physical merchant location. In various embodiments, POS device 120 may be implemented as a personal computer (PC), a payment terminal device with payment processing components, a smart phone, laptop/tablet computer, wristwatch with appropriate computer hardware resources, other type of wearable computing device, and/or other types of computing devices capable of transmitting and/or receiving data. Although only one device is shown, a plurality of device may function similarly. POS device 120 of FIG. 1 contains a POS purchase message 122 that may be transmitted to transaction processor 130 for processing and resolution, which may be sent asynchronously from messages from card payment system 110.

Transaction processor 130 may be maintained, for example, by an online service provider, which may provide processes to provide account services and process payments. In this regard, transaction processor 130 includes one or more processing applications which may be configured to interact with card payment system 110, POS device 120, and/or another device/server to facilitate communications for transactions, payment processing, and receipt provision for merchants and users. Further, transaction processor 130 may receive messages from card payment system 110, POS device 120, and/or another device/server asynchronously, which transaction processor 130 may then correlate and merge or combine for processing. Transaction processor 130 may be maintained by or include another type of platform or service provider, for example, a transaction processor such as PAYPAL®, Inc. of San Jose, CA, USA.

Transaction processor 130 of FIG. 1 includes a message queue handler 140, a transaction processing application 132, a database 136, and a network interface component 138. Message queue handler 140 and transaction processing application 132 may correspond to executable processes, procedures, and/or applications with associated hardware. In other embodiments, transaction processor 130 may include additional or different modules having specialized hardware and/or software as required.

Message queue handler 140 may correspond to one or more processes to execute modules and associated specialized hardware of transaction processor 130 to process messages from different messages queues for short-term storage in a data cache, ephemeral storage, or the like and correlation of the messages after polling the queues using specific polling operations for improved efficiency, speed, and reliability in message processing. In this regard, transaction processing application 132 may correspond to specialized hardware and/or software usable to perform one or more services for data message processing including processing and correlating of card payment message 112 and POS purchase message 122. In this regard, message queue handler 140 may receive messages 112 and 122 from card payment system 110 and POS device 120, which may then be stored for processing. Storage operations 142 may be executed to store messages 112 and 122 immediately, periodically, or at specific time intervals to a database having an ephemeral or short-term storage (e.g., a data cache or other storage component or medium for fast access and short-term storage) for each message queue.

Each message queue may correspond to a specific domain and therefore may be identified using domain IDs for each message queue (e.g., card payment message queue or POS purchase message queue). As such, as messages are assigned to a queue based on the endpoint, device, application, or the like providing and/or transmitting the message to transaction processor 130, the messages may be stored to the storage with a corresponding domain ID so that each message is identified in their corresponding storage with a domain ID for the message queue from which the messages originated and/or were received. As such, storage operations 142 may provide, assign, or attach a domain ID to each of messages 112 and 122, as well as other messages, when received and stored to their corresponding storages.

After storage, one of the queues and/or domain IDs may be designated as a primary queue and the other queue's storage may be polled at intermittent time intervals for a corresponding message with the other domain ID. Polling operations 144 may therefore poll different queues at specific time intervals based on whether they are the primary queue or the secondary queue to be polled for correlation to a message in the primary queue. Polling may be performed by polling operations 144 using an exponential back off 146 with a jitter 148, which may introduce a specific polling interval to poll a queue's storage for message correlation. Exponential back off to polling may correspond to polling at the time intervals that may be progressively increased (e.g., using a back off or time internal increase parameter for exponential backoff 144). Exponential backoff 144 may increase the time intervals successively, such as by an exponential amount between each consecutive time period between polling. Jitter 148 may be introduced to vary the increased time interval and ensure that synchronous polling by too many message correlation requests and handlers does not occur. A such, jitter may introduce a randomization or variance to the time periods between polling and/or polling time intervals so that polling events do not overlap or occur simultaneously and introduce a "thundering herd" problem or other issue with too many polling requests or events occurring at once. Correlation of messages may be based on message content, message identifiers, message information or body, metadata, and the like. Once polled and correlated, the messages may be combined or handled together, such as by transaction processing application 132. Using messages 112 and 122 processed through message queue handler 140 for correlation and/or merging, transaction processing application 132 may then process transaction data and messages, such as by effectuating payment and/or transfers to merchant accounts from payment instruments and/or accounts of users.

Transaction processing application 132 may correspond to one or more processes to execute modules and associated specialized hardware of transaction processor 130 to provide service for account usage, digital electronic communications, electronic transaction processing, and the like. In this regard, transaction processing application 132 may correspond to specialized hardware and/or software used by a user to utilize one or more services for electronic transaction processing. Transaction processing application 132 may be used by a user associated to establish a payment account and/or digital wallet, which may be used to process transactions. In various embodiments, financial information may be stored to the account, such as account/card numbers and information. A digital token for the account/wallet may be generated, provided, and used to send and process payments, for example, through an interface provided by transaction processor 130. The payment account may be accessed and/or used through a browser application/extension and/or dedicated payment application on a mobile device, card payment system 110, POS device 120, and the like to engage in transaction processing through transaction processing application 132.

In various embodiments, transaction processing application 132 may process transaction 134 based on messages 112 and 122 received from card payment system 110 and POS device 120, which may require correlation from message queue storages, such as ephemeral or short-term storages, to process and/or record transaction 134. As such, message queue handler 140 may be used to correlate messages when received and may provide such messages, after correlation, to transaction processing application 132 for transaction processing based on transaction details and payment information. For example, transaction processing application 132 may utilize transaction and financial instrument data (e.g., payment card data) from card payment message 112 and item or transaction information from POS purchase message 122 to process transaction 134 using the payment (e.g., debit/credit) card or another financial instrument. Transaction processing application 132 may process transaction 134 and may provide transaction details for transaction authorization, approval, or denial. Transaction processing application 132 may further include messaging, social networking, media posting or sharing, microblogging, data browsing and searching, online shopping, and other services available through transaction processor 130.

In various embodiments, transaction processor 130 includes other applications as may be desired in particular embodiments to provide features to transaction processor 130. For example, the other applications may include security applications for implementing server-side security features, programmatic client applications for interfacing with appropriate application programming interfaces (APIs) over network 150, or other types of applications. Other applications may also include server interface applications for an online server platform that output data to one or more devices. For example, the other applications may contain software programs, executable by a processor, including a graphical user interface (GUI) configured to provide interface data for display on devices.

Additionally, transaction processor 130 includes and/or is associated with database 136. Database 136 may store various identifiers associated with card payment system 110. Database 136 may also store account data, including payment instruments and authentication credentials, as well as transaction processing histories and data for processed transactions. Database 136 may store financial information and tokenization data. Database 136 may further include or correspond to storage components and/or mediums for storage of data from message queues and/or data in message queues, such as messages 112 and 122, domain identifiers for messages 112 and 122, and/or other data that may be used for correlating messages 112 and 122, which may be used by storage operations 142 for storing messages 112 and 122 when received. In this regard, such storage components may be polled by polling operations 144 using exponential back off 146 and jitter 148 for message correlation. Although database 136 is shown as residing on transaction processor 130 as a database, in other embodiments, other types of data storage and components may be used including cloud computing storage nodes, remote data stores and database systems, distributed database systems over network 150 and/or of a computing system associated with transaction processor 130, and the like.

In various embodiments, transaction processor 130 includes at least one network interface component 138 adapted to communicate card payment system 110, POS device 120, and/or other devices or server over network 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including WiFi, microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
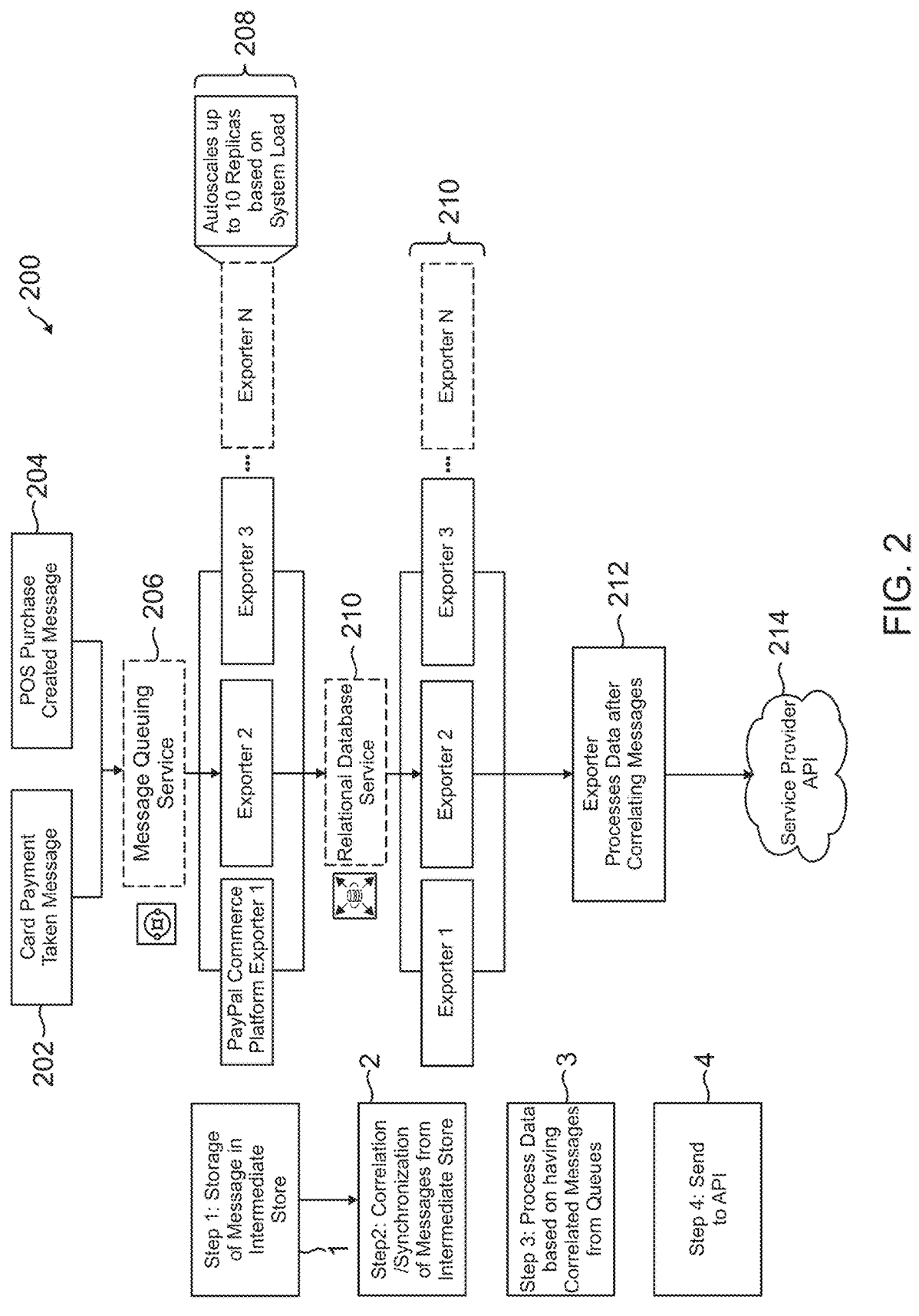
FIG. 2 is an exemplary system environment used to process and correlate messages received asynchronously from different message queues, according to an embodiment.

FIG. 2 is an exemplary system environment 200 used to process and correlate messages received asynchronously from different message queues, according to an embodiment. In system environment 200, steps 1-4 are shown where messages are received asynchronously and then processed in order to provide correlated data to a processing API. In this regard, steps 1-4 may be performed by transaction processor 130 when receiving messages 112 and 122 from card payment system 110 and POS device 120, respectively, as shown in system 100 of FIG. 1.

In this regard, initially messages originate from a transaction processing event and/or request at a POS device and with a payment terminal, such as by a merchant entering items to a POS device for a transaction and/or generating a transaction, which is transmitted to a service provider as a message, and a user providing a payment instrument and/or information to a payment terminal, which is also transmitted to the service provider as another message. For example, a card payment taken message 202 may be transmitted from a payment terminal to a message queueing service 206 when a payment instrument, such as a credit card, mobile application and/or digital wallet token, or the like is read by a payment terminal. Further, a POS purchase created message 204 may be transmitted by a POS device to message queueing service 206 when the transaction is generated. When received, at step 1, 1-N exporters 208 may cause storage of the messages in an intermediate data store, such as an ephemeral or short-term storage of the service provider. Exporters 208 may be instanced and/or replicated up to a set number or amount in order to properly handle messages from different queues and store the messages with domain IDs to corresponding storage components or mediums. As such, exporters 208 may move messages from message queueing service 206 to a relational database service 210, which may include the ephemeral or short-term storages allowing for access when synchronizing and/or correlating messages.

At step 2, correlation and/or synchronization of messages from the intermediate store, relational database service 210, occurs. A message from the primary queue may be parsed, analyzed, or processed to determine data used for correlating and/or synchronizing to another message in another queue. A polling process or operation may then poll the storage for the other message queue in relational database service 210 at preset, selected, or predetermined intervals, which may have a corresponding exponential back off to the intervals, for searching for and matching the data, such as identifiers, metadata, or information from the primary queue's message, to another message that may have arrived at a different time due to differences in device and/or network speeds, bandwidth, processing or generation time, latency, etc. A jitter factor or parameter may also introduce a variance or randomness to the time between polling events and/or when polling events occur to offset polling events from all occurring at the same time or together. The exponential back off and jitter may be set for exponential increase, or increase according to another factor, multiplier, or the like, the time with variance between polling events. Once correlated, exporters 210 may be used to export the data to another component, processing stack, application, API, or the like for data processing.

At step 3, data is processed based on having correlated messages from the message queues. An exporter 212 may process the data after correlating messages by transferring the data to the proper data processor and/or handler, which may correspond to different applications, decision services or microservices, system components, servers/devices, or the like, which properly handle the data. For example, with transaction processing, a transaction processing application and system may be used to process a payment. At step 4, the data is sent to the API, such as a service provider API 214, for management and providing the resulting output to the service provider, user, merchant, or the like. For example, a payment may be processed and a receipt or transaction history may issue, or the payment may be declined. Other results of computing service usage may also be issued.

Figure 3:
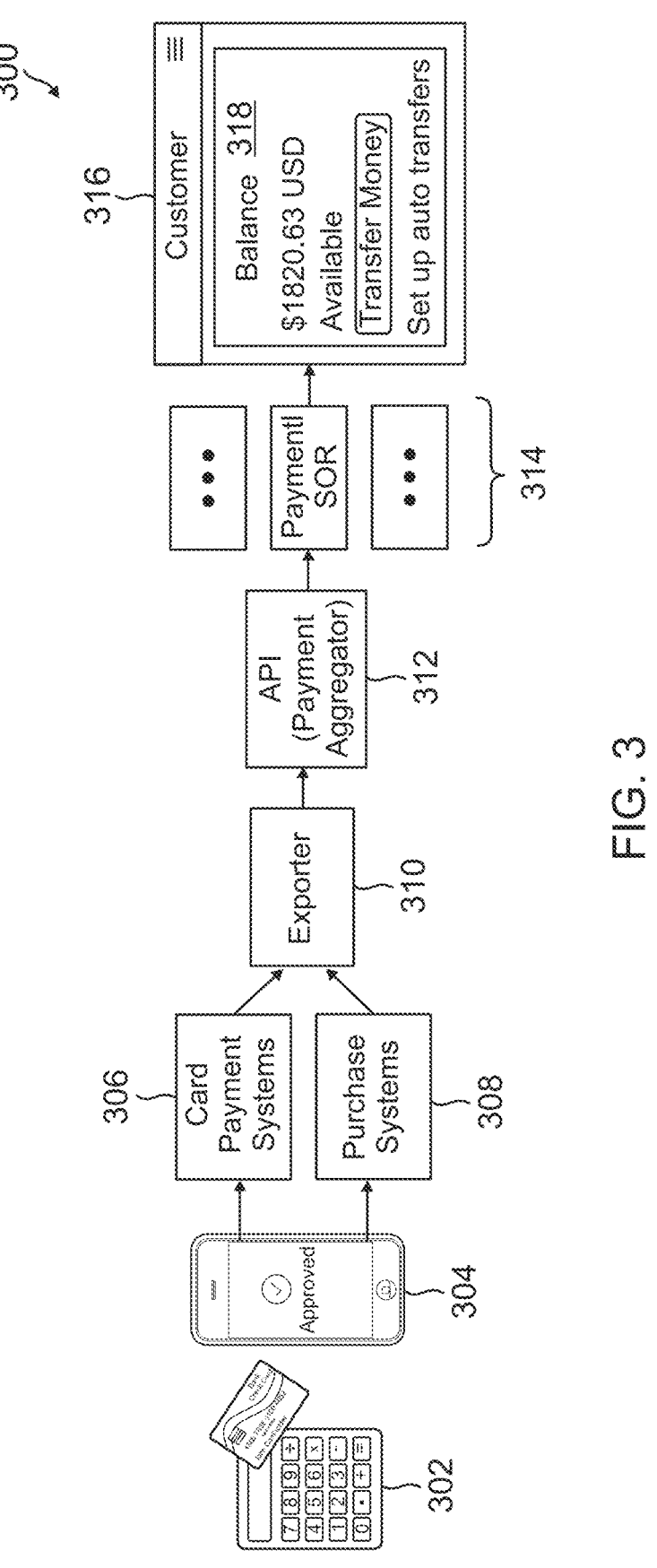
FIG. 3 is an exemplary diagram of incoming messages received asynchronously that are correlated for use in transaction data processing using a data processing stack of a service provider, according to an embodiment.

FIG. 3 is an exemplary diagram 300 of incoming messages received asynchronously that are correlated for use in transaction data processing using a data processing stack of a service provider, according to an embodiment. Diagram 300 demonstrates the incoming messages being processed by different systems in order to correlate and effectuate a payment to a merchant account during electronic transaction processing. In this regard, diagram 300 shows a processing flow that may correspond to the interactions of card payment system 110 and POS device 120 interacting with transaction processor 130 in system 100 of FIG. 1.

In diagram 300, initially a card reader 302 and a POS device 304, which may include merchant registers, mobile phones with merchant and/or sales applications, and the like, may be utilized and/or interact to generate a transaction and process the transaction though digital transaction messages transmitted to a transaction processor or other service provider that includes card payment systems 306 and purchase systems 308. In this regard, card payment systems 306 may include a message queue and/or data processors that handle and process messages from card payment systems, such as payment terminals that may read payment cards and/or mobile devices for payment information, payment and/or digital wallet tokens, and the like. Purchase systems 308 may include a similar message queue and data processors, but may instead handle and process messages from POS devices and other merchant devices, registers, and the like that generate and process transaction information including item information, item prices or costs, transaction costs (e.g., tax, tip, shipping, etc.), fees, and the like. Together, card payment systems 306 and purchase systems 308 may receive messages in corresponding messages queues that receive and handle messages from card reader 302 and POS device 304, respectively. These messages may be processed as shown in diagram 200 of FIG. 2 to correlate the messages using a polling operation that selects a primary queue and polls the secondary queue at set intervals with exponential back off and/or jitter. This allows for message correlation of the messages handled by card payment systems 306 and purchase systems 308, which then may be used to create and process a transaction and/or payment record and details for a transaction processing system.

An exporter 310 may be utilized to receive the combined, synchronized, correlated, and/or generated message data for a transaction and/or payment record (e.g., a data package, structure, or container) for the correlated messages from card payment systems 306 and purchase systems 308. Exporter 310 may then provide the message data to an API 312, which may correspond to a payment aggregator, that then aggregates the data and processes the data for a payment system of record (SOR) 314. Payment SOR 314 may store transaction records from the message data aggregated and processed by API 312, which then may be used to provide a transaction history, update an account and/or account balance, provide notifications to users and/or merchants, or otherwise handle, process, and provide the record generated from the synchronized and correlated messages from card reader 302 and POS device 304, which were stored and correlated through the polling performed with the message queues of card payment systems 306 and purchase systems 308, respectively. As such, a customer account 316 may have a balance 318 that shows an updated balance and/or history of the payment processed from those messages generated and transmitted to the transaction processor by card reader 302 and POS device 304.

Figure 4:
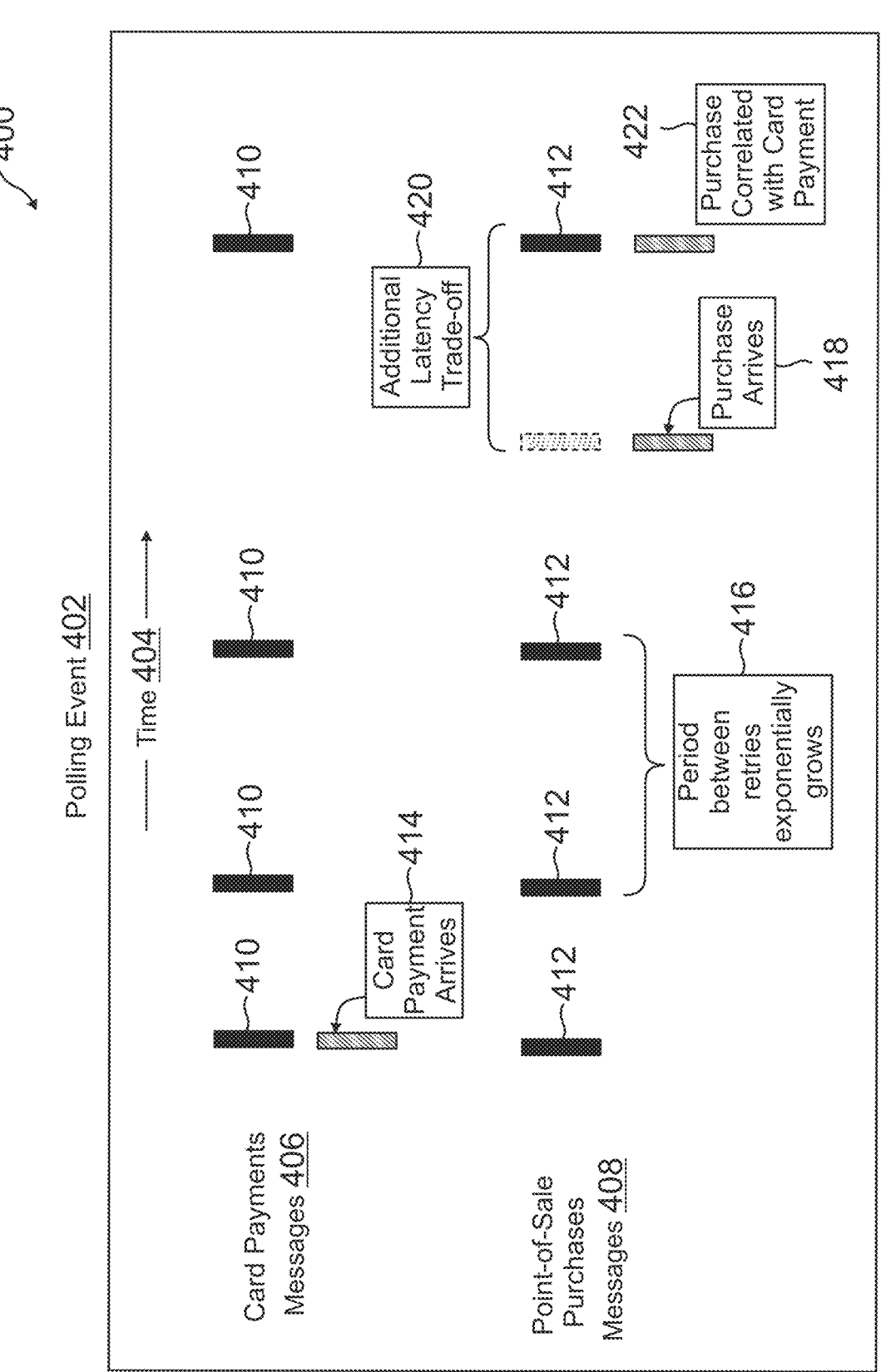
FIG. 4 is an exemplary diagram of asynchronous message receipt and processing over time by a service provider, according to an embodiment.

FIG. 4 is an exemplary diagram 400 of asynchronous message receipt and processing over time by a service provider, according to an embodiment. Diagram 400 demonstrates card messages received asynchronously over time where polling events may occur in order to correlate purchase data with card payment data. In this regard, diagram 400 shows a polling process executed by a transaction processor for correlating messages from different endpoints, such as one performed by polling operations 144 when handling messages 112 and 122 by message queue handler 140 of transaction processor 130 in system 100 of FIG. 1.

In diagram 400, polling events 402 may represent computing read requests, queries, searches, or other events that attempt to read message data from storages of different messages queues where digital messages with domain identifiers may be stored for synchronization and correlation, such as an ephemeral or short-term storage component. As such, polling events 402 occur over a time 404, such as at different time intervals or time periods between events, and may read card payment messages 406 and/or POS purchases messages 408 from their corresponding storage for a card payment messages queue and/or a POS purchases messages queue, respectively. Polling events 402 may occur to correlate messages for the same transaction or other data processing request from card payment messages 406 and POS purchases messages 408. Once correlated, the message data may be processed, recorded, and/or provided to another endpoint, which may allow for processing and finalizing a transaction, as well as providing a transaction history, balance update, and the like.

In this regard, polling events 402 may be scheduled to occur at time intervals 410 with card payment messages 406 and time intervals 412 with POS purchases messages 408. Time intervals 410 and 412 may be scheduled to occur together initially and/or may be set to occur once a first message is detected in one of card payment messages 406 or POS purchases messages 408 from an initial polling event, thereby designating that queue and storage as the primary queue/storage and then polling the other secondary queue/storage at time intervals 410 or 412. Further, time intervals 410 and 412 may be set to have exponential back off, as shown by the increasing time between each of polling events 402 that occur at time intervals 410 and 412. Jitter may further be introduced to polling events 402 to provide some variance or randomization to the exponential back off and/or time of each of time intervals 410 and/or 412, such as a small addition or subtraction of a few milliseconds or the like, which allows for avoiding too many simultaneous ones of polling events 402 from occurring.

For example, a card payment message arrival 414 may be received and/or detected in storage at time 0 of time interval 410 by polling events 402. This initiates a process where the message queue and storage for card payment messages 406 may be designated as the primary queue/storage for polling purposes, where the message from card payment message arrival 414 may not be searched to correlate with a message from POS purchases messages 408. Polling events 402 may then occur at time intervals 412 with an exponential back off 416, which may poll the storage for the queue corresponding to POS purchases messages 408 for the corresponding message, such as by searching for the same or similar identifiers, message content or information, metadata, or the like. When a purchase message arrival 418 occurs at a later time after time 0 but between time 2 and time 3 for polling events 402, the message may be stored. Thereafter, at time 3 of time interval 412, one of polling events 402 occurs, which causes a message correlation 422 to occur for the card payment message from card payment message arrival 414 and the POS purchase message from purchase message arrival 418. Message correlation 422 then allows for a full message and/or transaction record to be generated and the messages correlated for further processing and/or storage.

As such, in diagram 400, messages may be received asynchronously and polled for correlating in order to process in a single data processing event or transaction, which may be required when processing payment and transfers electronically. In this regard, the black bars show polling events that may occur for matching messages received asynchronously from two or more message queues and communication channels. The black bars are shown in increasing space between to denote exponential backoff wait between polling events, such as polling every 2, 4, 8, to 16 seconds sequentially in order to reduce the polling events and reduce or conserve system resources utilized during polling. A card payment message may arrive at a first polling event, and thereafter another message queue and queue storage for the secondary queue is also polled for a correlated message. If not found, polling may continue with the period between retrieve exponentially growing and jitter may be introduced in order to prevent multiple polling events from becoming synchronized and causing many polling events to occur at a same time, otherwise taxing the system resources or cause the system to crash.

Later, the purchase message may arrive from the secondary message queue and be stored in the corresponding queue storage. A polling event may not occur immediately due to exponential backoff wait with increasing time intervals between polling increasing. While this may introduce some latency, the latency is greatly reduced while conserving system resources utilized when polling. Thus, at a later polling event, the purchase message in the secondary queue and queue storage is correlated with the card payment message. Once found, a data container or object may be generated from a combination of the messages for processing.

FIG. 5 is a flowchart 500 for correlating messages from asynchronous message queues using polling with exponential backoff and jitter, according to an embodiment. Note that one or more steps, processes, and methods described herein of flowchart 500 may be omitted, performed in a different sequence, or combined as desired or appropriate.

At step 502 of flowchart 500, transaction messages from two message queues are received. For example, in system

100 of FIG. 1, card payment system 100 may generate card message 112 during transaction processing, such as in response to receiving a digital wallet message or token from a mobile device (e.g., via RFID, NFC, or the like), reading a payment card (e.g., via an EMV chip, magnetic stripe, NFC/RFID chip, etc.), or the like. Card message 112 may include information for a payment card, digital wallet, payment token, or the like. Further, POS device 120 may generate POS purchase message 122, which may correspond to details of the transaction including a receipt, items purchased, transaction cost and/or identifiers, and the like. As such, two or more messages may be received by transaction processor 130. The transaction messages may include different data messages for transaction data from different data and transaction processing components, such as card payments data from payment terminals and POS transaction data from POS devices. Each message may be received asynchronously and at different times, and therefore may require correlation.

At step 504, the messages are stored with domain identifiers in database storage. When transaction processor 130 receives card payment message 112 and POS purchase message 122, transaction processor 130 may execute storage operations 142 to store messages 112 and 122 to short-term, intermediary, and/or ephemeral storage (e.g., a data cache or the like) independently, each having separate storages for the corresponding messages and an attached domain identifier for the domain of the message queue from which messages 112 and 122 are received. As such, each message may be received in a separate message queue that corresponds to the communication channel, endpoint, and/or identifiers used to transmit the messages to the service provider. The messages may be associated with a particular domain for the message queue and components generating/transmitting the messages, which may have a domain ID that uniquely identifies the message queues for the messages. The domain identifiers may indicate whether the messages were received from a card processing terminal, POS device, or another endpoint and may be used to identify the message queue from which the messages were received and/or identify the storage used to store the messages. The messages may then be stored with this domain ID in an ephemeral storage that is cleared of the messages when they are correlated.

At step 506, a domain for one of the domain identifiers is selected as a primary domain for message correlation. For example, the domain for card payment message 112 or POS purchase message 122 may be selected as the primary domain, which may establish which domain, storage, queue, and/or polling process used to poll the other storage for the corresponding message to be correlated with the message in the primary domain. When this occurs, a process may be used to poll the other domain for the message so that correlation of the messages may occur, and a full message and transaction record may be generated. The service provider may select one of the domains randomly, procedurally, based on first receipt of messages (e.g., lowest latency), or preference/parameter established by an administrator or other user of the service provider. This allows for one domain to originally be polled for available messages to correlate.

At step 508, the database storage is polled for corresponding messages from another domain using received messages from the primary domain. Polling operations 144 may be used to implement the process for polling each data storage for the correlating messages by searching for messages having the same or similar data, such as matching transaction identifiers, transaction information, card identifiers, username or information, communication or payment processing session identifier, and the like. Polling operations 144 may further implement exponential back off 146 and jitter 148 to improve the polling operations by providing more efficiency and preventing or lowering issues with too many polling requests occurring at once. The database storage may be polled at different time intervals for correlated messages to messages in the primary domain and having the primary domain ID. Polling may search for matching, similar, or correlated messages with other, secondary domain IDs from the other message queue(s). Polling may occur with an exponential backoff wait such that the time interval is progressively increased between polling events, and jitter to the backoff and time interval increase, or variation may be added to prevent polling events from becoming overly synchronized.

At step 510, the corresponding messages are correlated when found in the database storage based on the polling. For example, the short-term or ephemeral storage, such as one provided by or implemented with database 136, may be polled and a message found by comparing and matching message data, identifiers, metadata, and/or other information. When messages from the secondary domain and message queue are found from the polling and match the message from the primary queue, the messages may be correlated and stored in conjunction. In further embodiments, the messages may also be used to generate a data container or object for processing, which may allow for the transaction processor or other service provider to complete transaction processing and/or effectuate a payment to a merchant account or digital wallet. A full message, history, or transaction record may then be generated as a combination of the messages, which may correspond to transaction 134 processed based on messages 112 and 122.

Figure 6:
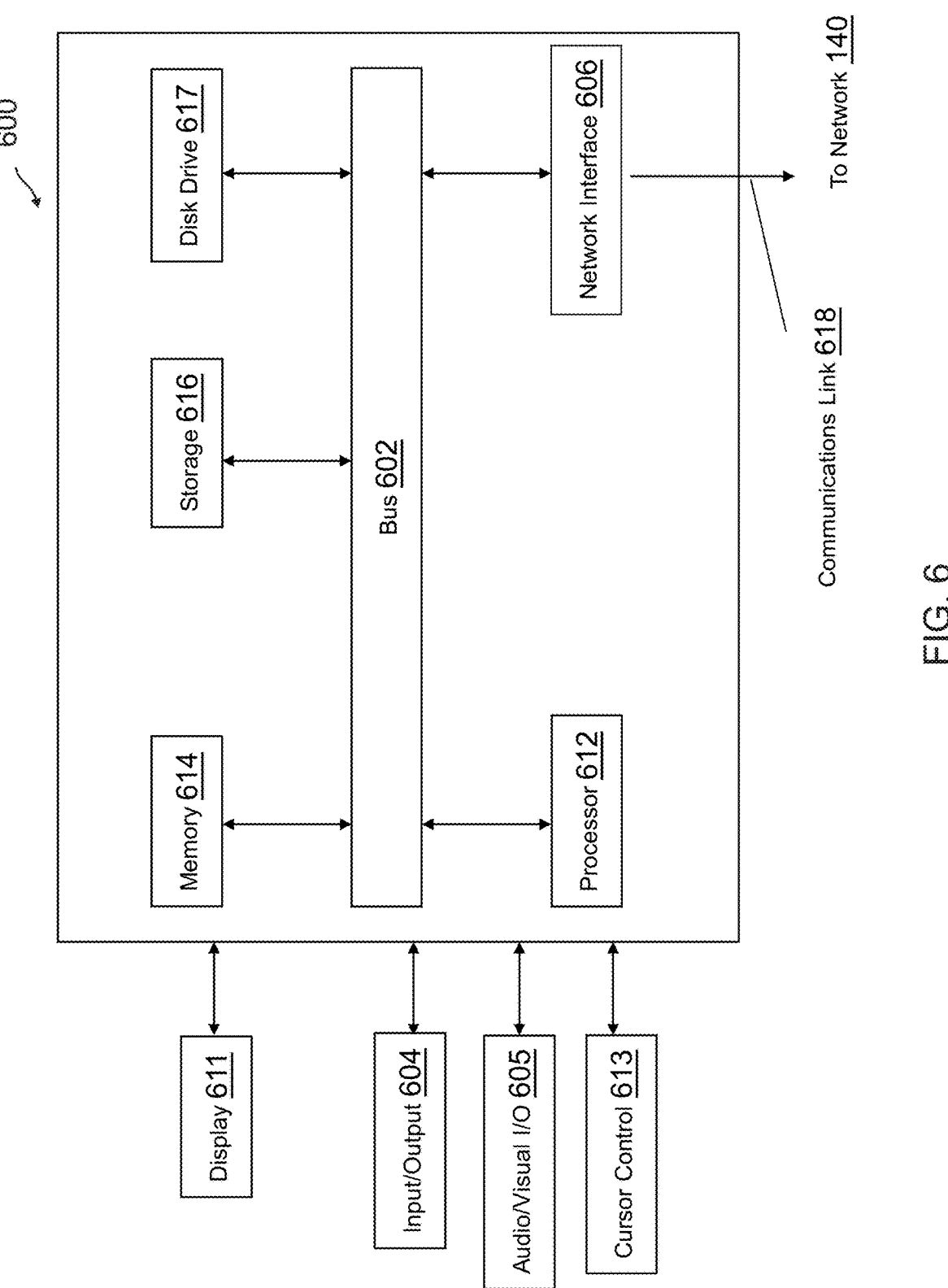
FIG. 6 is a block diagram of a computer system suitable for implementing one or more components in FIG. 1, according to an embodiment.

FIG. 6 is a block diagram of a computer system 600 suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 600 in a manner as follows.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons, image, or links, and/or moving one or more images, etc., and sends a corresponding signal to bus 602. I/O component 604 may also include an output component, such as a display 611 and a cursor control 613 (such as a keyboard, keypad, mouse, etc.). An optional audio input/output component 605 may also be included to allow a user to use voice for inputting information by converting audio signals. Audio I/O component 605 may allow the user to hear audio. A transceiver or network interface 606 transmits and receives signals between computer system 600 and other devices, such as another communication device, service device, or a service provider server via network 150. In one embodiment, the transmission is wireless, although other transmission mediums and methods may also be suitable. One or more processors 612, which can be a micro-controller, digital signal processor (DSP), or other processing component, processes these various signals, such as for display on computer system 600 or transmission to other devices via a communication link 618. Processor(s) 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor(s) 612 and other components by executing one or more sequences of instructions contained in system memory component 614. Logic may be encoded in a computer readable medium, which may refer to any medium that participates in providing instructions to processor(s) 612 for execution. Such a medium may take many forms, including but not limited to, non-volatile media, volatile media, and transmission media. In various embodiments, non-volatile media includes optical or magnetic disks, volatile media includes dynamic memory, such as system memory component 614, and transmission media includes coaxial cables, copper wire, and fiber optics, including wires that comprise bus 602. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:

a non-transitory memory; and one or more hardware processors coupled to the non-transitory memory and configured to read instructions from the non-transitory memory to cause the system to perform operations comprising:

receiving, from a first message queue, a first transaction message associated with a first transaction processing component of the system, wherein the first transaction message originates from a card transaction at a point of sale (POS) terminal;

storing the first transaction message in a database tagged with a first domain identifier associated with the first transaction processing component;

selecting the first domain identifier as a primary domain identifier for message polling;

polling the database at designated intervals for a second transaction message associated with the first transaction message using message data associated with the first transaction message and a second domain identifier, wherein the second transaction message further originates from the card transaction and is stored in a second message queue and is associated with a second transaction processing component corresponding to the second domain identifier;

identifying the second transaction message after at least one of the designated intervals based on the polling;

correlating the first transaction message and the second transaction message usable for one or more transaction processing operations of the card transaction;

combining the first transaction message and the second transaction message for data processing by a computing service;

generating a combined data container based on the combined first and second transaction message, wherein the combined data container comprises actionable data for the data processing by the computing service; and deleting the first transaction message and the second transaction message from the database subsequent to the combining.

2. The system of claim 1, wherein the first message queue comprises one of a card payment message queue or POS message queue and the first transaction processing component comprises one of the POS terminal or a payment instrument reader at the POS terminal, and wherein the second message queue comprises another one of the card payment message queue or the POS message queue and the second transaction processing component comprises another one of the POS terminal or the payment instrument reader.

3. The system of claim 2, wherein the storing the first transaction message comprises storing a plurality of transaction messages including the first transaction message and the second transaction message each with a corresponding one of a plurality of domain identifiers at different times based on times of receipt of the plurality of transaction messages.

4. The system of claim 1, wherein the first transaction message is stored to an ephemeral queue storage in a cloud computing system that is cleared of the first transaction message and the second transaction message after the correlating.

5. The system of claim 1, wherein the polling is performed using an exponential backoff to the designated intervals that increases a time period between consecutive ones of the designated intervals.

6. The system of claim 5, wherein the operations further comprise:

introducing a jitter parameter to the polling performed using the exponential backoff.

7. The system of claim 6, wherein introducing the jitter parameter prevents or limits synchronous polling of the database for different correlations of a plurality of transaction messages.

8. The system of claim 1, wherein the operations further comprise:

generating, based on the combined data container, a transaction data object associated with the first transaction message and the second transaction message; and processing the transaction data object using a transaction data processing stack of the system.

9. A method comprising:

receiving, from a first message queue, a first transaction message associated with a first transaction processing component of a service provider system, wherein the first transaction message originates from a card transaction at a point of sale (POS) terminal;

storing the first transaction message in a database tagged with a first domain identifier associated with the first transaction processing component;

selecting the first domain identifier as a primary domain identifier for message polling;

polling the database at designated intervals for a second transaction message associated with the first transaction message using message data associated with the first transaction message and a second domain identifier, wherein the second transaction message further originates from the card transaction and is stored in a second message queue and is associated with a second transaction processing component corresponding to the second domain identifier;

identifying the second transaction message after at least one of the designated intervals based on the polling;

correlating the first transaction message and the second transaction message usable for one or more transaction processing operations of the card transaction;

combining the first transaction message and the second transaction message for data processing by a computing service;

generating a combined data container based on the combined first and second transaction message, wherein the combined data container comprises actionable data for the data processing by the computing service; and deleting the first transaction message and the second transaction message from the database subsequent to the combining.

10. The method of claim 9, wherein the first message queue comprises one of a card payment message queue or POS message queue and the first transaction processing component comprises one of the POS terminal or a payment instrument reader at the POS terminal, and wherein the second message queue comprises another one of the card payment message queue or the POS message queue and the second transaction processing component comprises another one of the POS terminal or the payment instrument reader.

11. The method of claim 10, wherein the storing the first transaction message comprises storing a plurality of transaction messages including the first transaction message and the second transaction message each with a corresponding one of a plurality of domain identifiers at different times based on times of receipt of the plurality of transaction messages.

12. The method of claim 9, wherein the first transaction message is stored to an ephemeral queue storage in a cloud computing system that is cleared of the first transaction message and the second transaction message after the correlating.

13. The method of claim 9, wherein the polling is performed using an exponential backoff to the designated intervals that increases a time period between consecutive ones of the designated intervals.

14. The method of claim 13, further comprising:
    introducing a jitter parameter to the polling performed using the exponential backoff.

15. The method of claim 14, wherein introducing the jitter parameter prevents or limits synchronous polling of the database for different correlations of a plurality of transaction messages.

16. The method of claim 9, further comprising:
    generating, based on the combined data container, a transaction data object associated with the first transaction message and the second transaction message; and
    processing the transaction data object using a transaction data processing stack of the service provider system.

17. A non-transitory machine-readable medium having stored thereon machine-readable instructions executable to cause a machine to perform operations comprising:
    receiving, from a first message queue, a first transaction message associated with a first transaction processing component of a service provider system, wherein the first transaction message originates from a card transaction at a point of sale (POS) terminal;
    storing the first transaction message in a database tagged with a first domain identifier associated with the first transaction processing component;

selecting the first domain identifier as a primary domain identifier for message polling;
    polling the database at designated intervals for a second transaction message associated with the first transaction message using message data associated with the first transaction message and a second domain identifier, wherein the second transaction message further originates from the card transaction and is stored in a second message queue and is associated with a second transaction processing component corresponding to the second domain identifier;
    identifying the second transaction message after at least one of the designated intervals based on the polling;
    correlating the first transaction message and the second transaction message usable for one or more transaction processing operations of the card transaction;
    combining the first transaction message and the second transaction message for data processing by a computing service;
    generating a combined data container based on the combined first and second transaction message, wherein the combined data container comprises actionable data for the data processing by the computing service; and
    deleting the first transaction message and the second transaction message from the database subsequent to the combining.

18. The non-transitory machine-readable medium of claim 17, wherein the first message queue comprises one of a card payment message queue or POS message queue and the first transaction processing component comprises one of the POS terminal or a payment instrument reader at the POS terminal, and wherein the second message queue comprises another one of the card payment message queue or the POS message queue and the second transaction processing component comprises another one of the POS terminal or the payment instrument reader.

19. The non-transitory machine-readable medium of claim 18, wherein the storing the first transaction message comprises storing a plurality of transaction messages including the first transaction message and the second transaction message each with a corresponding one of a plurality of domain identifiers at different times based on times of receipt of the plurality of transaction messages.

20. The non-transitory machine-readable medium of claim 17, wherein the first transaction message is stored to an ephemeral queue storage in a cloud computing system that is cleared of the first transaction message and the second transaction message after the correlating.

* * * * *